(12) United States Patent
Dreval et al.

(10) Patent No.: US 12,328,291 B1
(45) Date of Patent: Jun. 10, 2025

(54) SPAM PREVENTION USING VECTOR-BASED TEXT SIMILARITY COMPARISONS ACROSS MULTIPLE TIME WINDOWS

(71) Applicant: INTUIT INC., Mountain View, CA (US)

(72) Inventors: Liran Dreval, Mountain View, CA (US); Itay Margolin, Petah Tikva (IL); Meghan Mergui, Ramat Gan (IL); Aviv Ben Arie, Ramat Gan (IL)

(73) Assignee: INTUIT INC., Mountain View, CA (US)

(*) Notice: Subject to any disclaimer, the term of this patent is extended or adjusted under 35 U.S.C. 154(b) by 4 days.

(21) Appl. No.: 18/588,814

(22) Filed: Feb. 27, 2024

(51) Int. Cl.
*H04L 51/212* (2022.01)
*G06F 40/194* (2020.01)
*G06F 40/284* (2020.01)

(52) U.S. Cl.
CPC .......... *H04L 51/212* (2022.05); *G06F 40/194* (2020.01); *G06F 40/284* (2020.01)

(58) Field of Classification Search
CPC ..... H04L 51/212; G06F 40/194; G06F 40/284
See application file for complete search history.

(56) References Cited

U.S. PATENT DOCUMENTS

| 8,560,619 B1* | 10/2013 | Huston | H04L 51/224 709/224 |
|---|---|---|---|
| 2015/0127174 A1* | 5/2015 | Quam | H04L 67/10 700/275 |
| 2018/0350180 A1* | 12/2018 | Onischuk | G07C 13/00 |
| 2021/0014270 A1* | 1/2021 | Thakur | H04L 63/1425 |

* cited by examiner

*Primary Examiner* — Minh Chau Nguyen
(74) *Attorney, Agent, or Firm* — Patterson + Sheridan, LLP

(57) ABSTRACT

Aspects of the present disclosure relate to detecting spam messages. Embodiments include creating condensed vector representations of messages; calculating similarity scores for each message relative to other messages using the vector representations; associating messages of the plurality of messages with a grouping based on the calculated similarity score for the messages within the grouping exceeding a threshold; determining that a grouping of messages are spam messages by comparing an amount of messages of the grouping of messages sent within a first time window to an amount of messages of the grouping of messages sent within a second time window, wherein the second time window comprises a time period preceding the first time window; providing the identified spam message to a machine learning model; and training the machine learning model by iteratively adjusting parameters of the model based on tracking the identified spam message through multiple layers of the model.

20 Claims, 6 Drawing Sheets

SPAM PREVENTION USING VECTOR-BASED TEXT SIMILARITY COMPARISONS ACROSS MULTIPLE TIME WINDOWS

INTRODUCTION

Aspects of the present disclosure relate to techniques for automatically detecting spam messages and preventing the transmission of spam messages. In particular, techniques described herein involve using dynamic machine learning and/or rules based techniques to compare the similarity of a message to messages sent during various time windows, and then automatically determining whether the message is spam based on the results of the comparison, as well as other features of the messages.

BACKGROUND

Every year millions of people, businesses, and organizations around the world utilize software applications to send and receive messages. For example, applications such as email accounts, instant messaging platforms, and the like allow for quick and convenient communication between users.

However, one consequence of the case and convenience of communication using messaging software applications is that users may be bombarded with unwanted "spam" messages. Spam messages come in many forms and have many purposes. For example, some spam messages attempt to sell the user products that the user is not interested in purchasing. Other spam messages attempt to fraudulently trick the user into giving the sender money, such as by impersonating a vendor with whom the user conducts legitimate business. Some spam messages may be sent to annoy and frustrate users in an attempt to drive the users away from using a particular messaging platform. Regardless of their purpose, spam messages worsen the user experience for users of messaging applications. Spam messages may also damage the reputation of messaging platforms. For example, if spam messages are frequently sent from a particular email domain, users may be hesitant to trust legitimate emails that come from that domain. Also, a large amount of computational resources may be wasted by sending and storing spam messages.

The number of spam messages sent on a particular messaging platform can be extremely large, which presents many challenges in automatically identifying and stopping spam messages. Some existing techniques for preventing spam messages involve identifying messages as spam by comparing incoming and/or outgoing messages to messages that have been confirmed as spam messages. This comparison may be performed, for example, by a machine learning model that has been trained to recognize messages that are similar to confirmed spam messages. Once senders of spam messages have been identified, they may be blocked from transmitting further spam messages on the platform. However, spam message senders often develop techniques for circumventing conventional automated anti-spam measures. For example, a spam sender may send spam messages from multiple accounts or from multiple internet protocol (IP) addresses to avoid detection. Also, spam message senders may alter the content of messages to evade security measures that have been configured to detect spam messages. For example, a machine learning model that has been trained to recognize spam messages based on previously detected spam messages may not be able to recognize an altered spam message until the machine learning model is trained to recognize similar messages. Currently, identification of such messages that are not detectable by existing techniques for automatic identification requires manual identification and labeling. Given the extraordinary amount of spam messages that may be sent on a daily basis on a particular platform, manual identification of undetected spam messages is often impractical. As a result, a large amount of spam messages may be sent before conventional anti-spam measures are updated (e.g., through updated training of machine learning models with newly identified spam messages) to account for altered spam messages.

Thus, there is a need in the art for improved techniques of automatically detecting spam messages and preventing the transmission of such messages.

BRIEF SUMMARY

Certain embodiments provide a method of detecting spam messages and preventing the transmission of spam messages. The method generally includes: retrieving data associated with a form, wherein the data associated with the form comprises: creating a vector representation of a message; calculating short-term similarity scores for the message relative to each of a plurality of messages sent within a first time window based on the vector representation of the message; calculating long-term similarity scores for the message relative to each of a plurality of messages sent within a second time window that is longer than the first time window based on the vector representation of the message; determining that the message is spam based on comparing: a first number of instances where a short-term similarity score of the short-term similarity scores exceeds a threshold; and a second number of instances where a long-term similarity score of the long-term similarity scores exceeds the threshold; and performing one or more actions to manage transmission of the message based on the determining that the message is spam.

Other embodiments provide an additional method of detecting spam messages and preventing the transmission of spam messages. The method generally includes: creating vector representations for a plurality of messages; calculating a similarity score for each message of the plurality of messages relative to other messages of the plurality of messages based on the vector representations; associating messages of the plurality of messages with a grouping based on the calculated similarity score for a given message of the plurality of messages exceeding a threshold; and determining that a grouping of messages are spam messages based on comparing an amount of messages of the grouping of messages sent within a first time window to an amount of messages of the grouping of messages sent within a second time window that is longer than the first time window Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
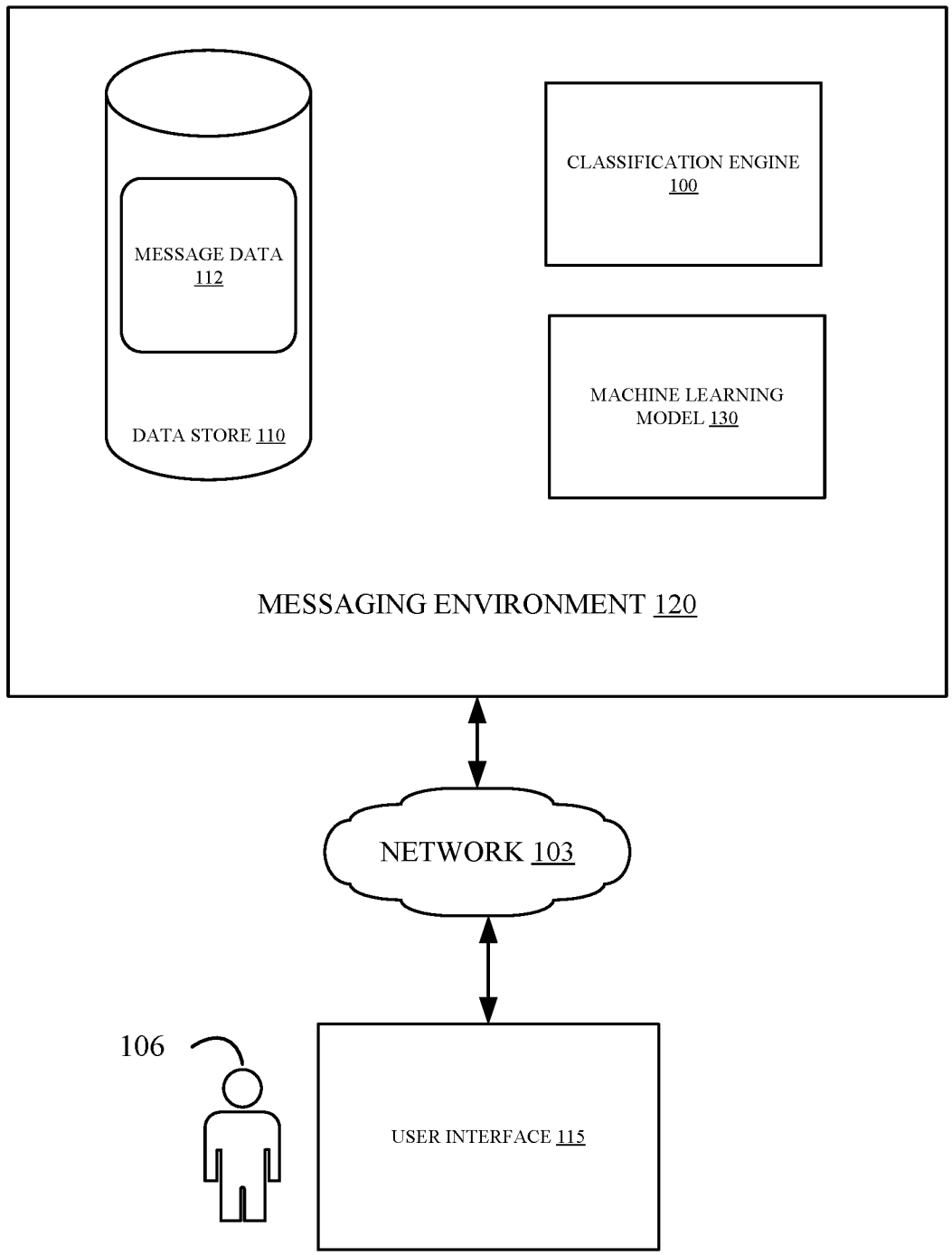
FIG. 1 depicts an example of computing components related to automatically detecting spam messages and preventing the transmission of spam messages.

Aspects of the present disclosure provide apparatuses, methods, processing systems, and computer-readable mediums for automatically detecting spam messages and preventing the transmission of spam messages.

Spam messages are typically removed once they are identified, such as through users manually flagging the messages as spam and anti-spam measures detecting and deleting spam messages based on the manually flagged messages. However, spam messages that have been recently altered (i.e., the spam sender recently altered a template for spam messages that are sent in large batches in order to avoid spam-detection measures) may not be detected by conventional anti-spam measures that identify spam based on automatically comparing messages to manually-flagged spam instances. As a result, these unidentified spam messages tend to have been sent more recently, whereas older spam messages will have been detected and removed. Accordingly, undetected spam messages may be similar to a relatively larger number of messages that have been sent recently; also, these undetected spam messages may be similar to a relatively smaller number of messages that were sent in the more distant past. By contrast, legitimate messages, which have not been removed as spam, will tend not to have such a similarity relationship based on time windows. For example, messages such as "good morning" and "I will see you soon" may be similar to a large number of recent messages as well as a large number of messages sent less recently. Accordingly, certain embodiments of the present disclosure involve comparing a message through a dynamic machine learning or rules-based technique to a plurality of historical messages, and the number of instances where a similarity score of the message relative to a message sent within a first time window exceeds a threshold is compared to the number of instances where a similarity score of the message relative to a message sent within a second, longer or older, time window exceeds a threshold. Based on an indication that the message is similar to a relatively larger number of messages within the shorter time window and a relatively smaller number of messages within the longer time window, it may be determined that the message is spam.

Messages are generally any type of written communication sent by an electronic communication device or over an online messaging platform. Examples of messages include text messages, email messages, messages sent through social media platforms, messages sent through online instant messaging platforms, and/or the like.

In some embodiments, vector representations of messages are created. The vector representations may include, for example, a sparse vector representation comprising a binary vector that indicates the presence or absence of certain words in the message. Some embodiments provide that the sparse vector may then be processed to create a condensed vector, such as by using a MinHash (min-wise independent permutations locality sensitive hashing) scheme. Other techniques for creating vector representations of messages as known in the art may be used as well. According to certain embodiments, the vector representations of the messages may include embedding representations of messages. An embedding generally refers to a vector representation of an entity that represents the entity as a vector in n-dimensional space such that similar entities are represented by vectors that are close to one another in the n-dimensional space.

Certain embodiments of the present disclosure provide that the vector representations of the messages may be used to determine similarity between messages. The similarity determination may be made, for example, by a processor configured to use a set of rules to assign similarity scores to vector representations of messages, such as based on the number of components the condensed vector representations share. As another example, a machine learning model may be trained to generate a similarity score based on embedding representations of the messages, such as using cosine similarity or another vector similarity metric. Other techniques for evaluating the similarity of messages as known in the art may be used as well.

According to some embodiments, a message may be compared to each of a plurality of messages sent within a first time window. This comparison may be used, for example, to generate a similarity score for the message relative to each of the plurality of messages sent within the first time window. The first time window may span, for example, from a given amount of time before the message was sent to the time when the message was sent.

In certain embodiments, a message may be compared to each of a plurality of messages sent within a second time window. This comparison may be used, for example, to generate a similarity score for the message relative to each of the plurality of messages sent within the second time window. The second time window generally spans a longer amount of time than the first time window, and/or covers a window of time that is further in the past than the first time window. For example, the second time window may span from a longer given amount of time before the message was sent to the time when the message was sent (e.g., longer compared to the given amount of time before the message was sent that is used to determine the first time window). In some embodiments, the message is not compared a second time to messages that were sent within the first time window to avoid duplicate comparisons (i.e., messages sent within the first time window may have already been compared to the message since the second time window includes the first time window, so the message does not need to be compared to these messages again). According to certain embodiments, the second time window and the first time window do not overlap (i.e., the first time window covers a first period of time, and the second time window covers a non-overlapping period of time that is further in the past than the first time window). Certain embodiments provide that multiple condensed vector representations may be made of the same message, such as MinHash representations of different sizes; the similarity scores may be generated based on the multiple vector representations of the message to capture similarities at different levels of granularity.

Some embodiments provide for tracking the number of instances where the similarity score between the message and a message sent within the first time window exceeds a threshold. In certain embodiments, the number of instances where the similarity score between the message and a message sent within the second time window exceeds a threshold is also tracked. It may be determined that the message is a spam message based on comparing these numbers. Spam messages may be detected by comparing the number of instances where the similarity score between the message and messages sent within the first time window exceeds a threshold and the number of instances where the similarity score between the message and messages sent within the second time window exceeds a threshold.

In certain embodiments, similarity scores between messages may be used to sort messages into groupings. For example, a similarity score may be calculated between a first message and a second message, and the similarity score may exceed a threshold. Based on the score exceeding a threshold, a group comprising the first and second message may be formed. Other messages that have similarity scores relative to a message within the group may be added to the group. In some embodiments, the inclusion of a message within a group may be based on the percentage of questions within the group for which the message has a similarity score exceeding the threshold.

Some embodiments of the present disclosure provide that groups of messages may be classified as spam based on comparing an amount of messages of the grouping of messages sent within a first time window to an amount of messages of the grouping of messages sent within a second time window. For example, as discussed above, the first time window may span from a given amount of time before the message was sent to the time when the message was sent, and the second time window may span a period of time that is further in the past than the first time window. As similarly discussed above, if a relatively larger number of messages within the grouping were sent recently while a relatively smaller number of messages were sent in an earlier time window, it may be determined that the messages within the group are spam. By contrast, if the number of messages sent within each time window is relatively uniform, the messages may not be classified as spam.

According to certain embodiments, one or more actions may be taken to manage transmission of a message based on determining that the message is spam. These actions may include, for example, blocking the message from being transmitted (e.g., blocking sending of the message or blocking receipt of the message), blocking the sender of the message from sending additional messages (e.g., by blocking any entity associated with the sender's IP address or other form of identification from using the services of the messaging platform), or using the identified spam message to develop anti-spam measures. This may include labeling the identified spam message as a spam message and including it in a training data set to train a machine learning model to recognize spam messages, resulting in an improved machine learning model that can identify previously undetectable spam messages (such as spam messages based on a template that was recently altered by a spam sender). In some embodiments, such a trained machine learning model may be retrained based on user feedback regarding the accuracy of the machine learning model in identifying spam messages. For example, users that have been verified as legitimate users (i.e., users that are trusted not to send spam messages, such as employees of the messaging platform, or recipients of the message) may indicate that a message was wrongly flagged as spam (or wrongly not flagged as spam), and the machine learning model may be retrained based on such feedback.

In some embodiments, a machine learning model may be trained to identify messages as spam messages based on features such as the number of instances where the similarity score between a message and messages sent within a first time window exceeds a threshold and the number of instances where the similarity score between the message and messages sent within the second time window exceeds a threshold (which may be the same as or different than the threshold used for the first time window). As discussed above, comparing the numbers of such instances may provide an indication that a message is spam, and a machine learning model may be trained to recognize messages as spam based on such an indication. Other features of a message may also be provided as inputs to the machine learning model. Such a machine learning model may be retrained based on user feedback regarding detected spam messages, as discussed above.

Embodiments of the present disclosure provide numerous technical and practical effects and benefits. For instance, millions of spam messages may be sent per day on a given messaging platform. Modifications to spam message templates made by spam senders can result in existing technologies failing to identify barrages of spam messages in time to prevent users from receiving and being affected by the spam messages. For instance, existing machine learning techniques require extensive amounts of labeled training data to recognize spam messages, which means that they may fail to recognize spam messages that have been altered compared to previously sent spam messages. By contrast, teachings of the present disclosure allow for automatic recognition of spam messages based on comparing the messages to a plurality of historically sent messages and determining that the occurrence of messages similar to the message is skewed toward a more recent time period. This results in fewer undetected spam messages. The benefits of being able to detect these previously undetectable messages are extensive. For example, techniques described herein improve computing security by automatically detecting and preventing spam messages that could not be detected using conventional automated spam detection techniques. Furthermore, the experience of users will improve as they are no longer bombarded with spam messages. Also, computing and energy resources that would otherwise be wasted on processing large amounts of undetected spam will be conserved. Additionally, teachings of the present disclosure result in an improvement to machine learning technologies, as existing technologies require training a machine learning model based on manually identified spam messages. By contrast, according to the teachings of the present disclosure, machine learning models may be automatically updated to detect altered spam messages. Additionally, by utilizing user feedback regarding spam message identification to retrain machine learning models that have been trained to identify spam messages, teachings of the present disclosure provide for a feedback loop through which the spam message identification system may be continuously improved.

Example Components Related to Detecting Spam Messages and Preventing the Transmission of Spam Messages FIG. 1 is an illustration of example computing components related to detecting spam messages and preventing the transmission of spam messages.

A user 106 may interact with a messaging environment 120 through a user interface 115. Messaging environment 120 may correspond to any type of electronic messaging environment, including internet based messaging platforms such as social media websites, email domains, instant messaging platforms, chatrooms, and/or the like. Messaging environment 120 may also correspond to messaging platforms for which the sending and receiving of messages are not internet-based, such as messaging platforms that use cellular signals to transmit messages. User interface 115 may run on any device capable of sending and/or receiving electronic text-based messages such as via the internet, cellular signals, and/or other similar methods of transmitting electronic messages.

The user interface 115 may be connected to the messaging environment 120 over a network. Network 110 may be representative of any type of connection over which data may be transmitted, such as a wide area network (WAN), local area network (LAN), cellular data network, and/or the like.

Messaging environment 120 may include a data store 110 for storing message data 112. Data store 110 generally represents a data storage entity such as a database or repository. Message data 112 includes the contents of electronic message sent by users, as well as data associated with the messages. The contents of a message may include any text within the message. Data associated with a message may include the time at which the message was sent, the time at which the message was received, data indicating the identity of the sender of the message, data indicating the recipients of the message, an indication of the platform from which the message was sent (e.g., an email may have been sent from a different messaging platform than the messaging platform associated with the messaging environment 120), a network address such as an internet protocol (IP) address, attributes of a device from which the message was sent, and/or the like. Message data 112 may also include vector representations of messages, as discussed below in further detail with respect to FIG. 2.

Messaging environment 120 may include a classification engine 100 that receives message data 112 from the data store. Based on the received message data 112, the classification engine 100 may classify messages as either spam or not spam, as discussed below in further detail with respect to FIG. 2.

Once a message has been identified as spam, one or more actions may be taken to prevent the transmission of the message. For instance, messaging environment 120 may block a user that attempted to send the message from sending the message. Additionally, the user may be blocked from sending other messages on the message platform. This may be accomplished by blocking messages that are associated with the user's device or are otherwise associated with the user (such as devices that use the same internet connection or same messaging platform profile). Intended recipients of the message may be blocked from receiving the message, or the message may be automatically filtered into a location such as a spam folder or a deleted messages folder. Other methods for processing identified spam messages as known in the art may be used.

Feedback may be received with regard to messages that are classified as spam messages. For instance, recipients of messages classified as spam may indicate that a message is not spam. Additionally, recipients of messages not classified as spam may indicate that a message is spam. Also, operators of the messaging platform or other individuals associated with the platform may correct classifications of messages.

Messages that have been provided to classification engine may be used as training data for a machine learning model. For example, messages identified by classification engine 100 as spam messages may be used as positive training data instances in training a machine learning model to identify spam messages. Messages that the classification engine 100 does not classify as spam messages may be used as negative training data instances in training a machine learning model to identify spam messages. Additionally, user feedback with respect to classified messages (e.g., confirming or rejecting such classifications) may be used to re-train, or fine-tune, a machine learning model, as discussed below.

In some embodiments, the messaging environment 120 includes a machine learning model 130 that is trained to identify spam messages. Training or fine-tuning of a machine learning model such as machine learning model 130 or another machine learning model (e.g., a machine learning model that may be used in classification engine 100 to compare vector representations of messages) may involve supervised and/or unsupervised learning processes. Supervised learning techniques generally involve providing training inputs to a machine learning model. The machine learning model processes the training inputs and outputs predictions based on the training inputs. The predictions are compared to the known labels associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Parameters adjusted during training may include, for example, hyperparameters, values related to numbers of iterations, weights, functions used by nodes to calculate scores, and the like. In some embodiments, validation and testing are also performed for a machine learning model, such as based on validation data and test data, as is known in the art.

As described in more detail below with respect to FIG. 2, machine learning model 130 may be trained to accept input features related to a message such as the number of instances where a similarity score of the message relative to a message sent within a first time window exceeds a threshold and the number of instances where a similarity score of the message relative to a message sent within a second, longer or older, time window exceeds a threshold, and/or the comparison of such numbers of instances. Machine learning model 130 may process the input features and output a classification of the message as either spam or not spam. A training data instance used to train machine learning model 130 may include features related to a historical message such as the number of instances where a similarity score of the historical message relative to a message sent within a first time window exceeds a threshold and the number of instances where a similarity score of the historical message relative to a message sent within a second, longer or older, time window exceeds a threshold, and/or the comparison of such numbers of instances, associated with a label indicating whether the historical message is spam or not spam (e.g., based on manual labeling and/or automated labeling using techniques described herein, such as automated labels that have been manually confirmed or at least not manually rejected).

Figure 2:
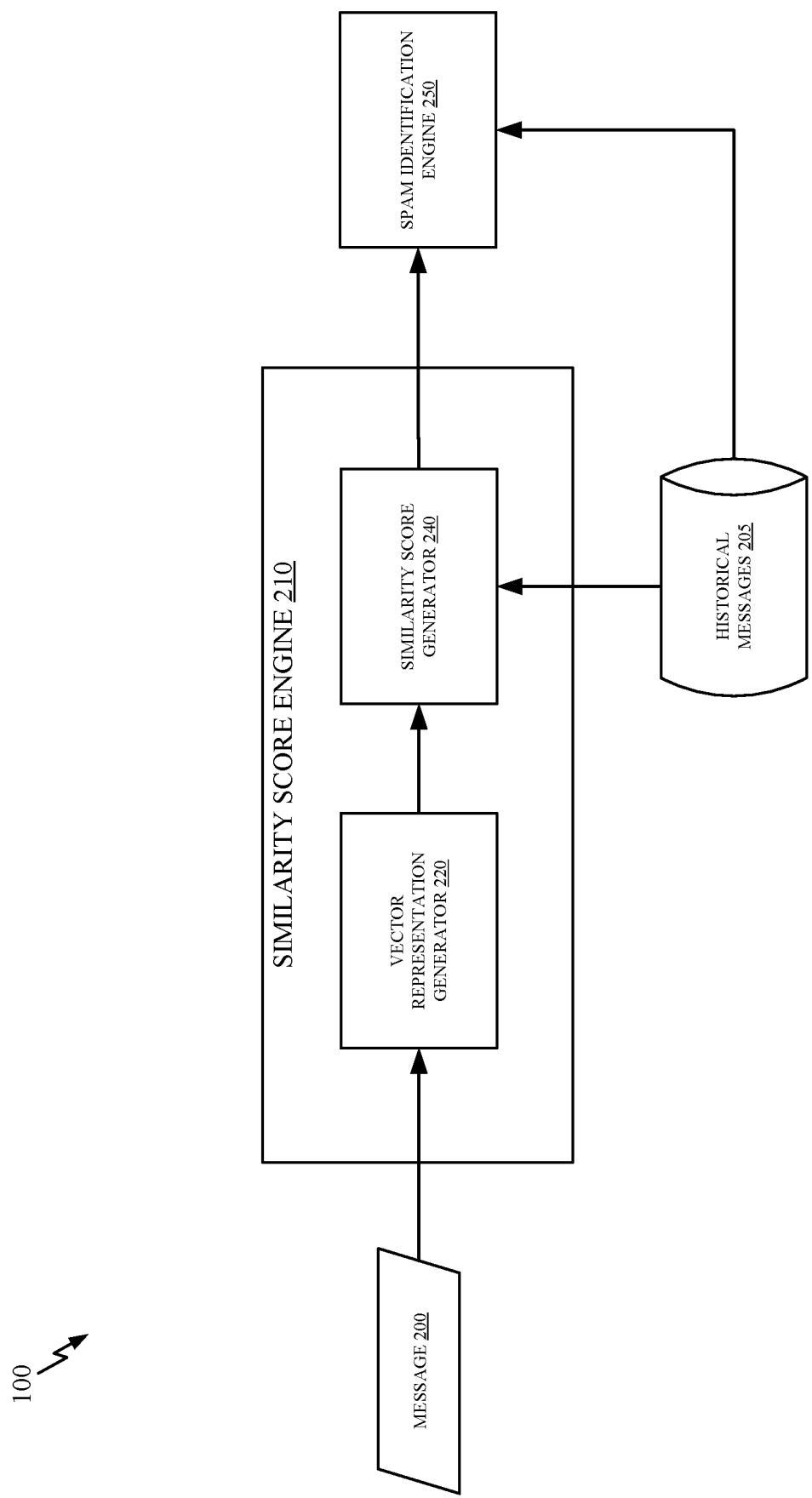
FIG. 2 depicts an example of computing components related to automatically detecting spam messages and preventing the transmission of spam messages.

Example Components Related to Detecting Spam Messages and Preventing the Transmission of Spam Messages FIG. 2 is an illustration of example computing components related to detecting spam messages and preventing the transmission of spam messages.

As discussed above with respect to FIG. 1, a messaging environment may contain a classification engine 100. The classification engine 100 may comprise a similarity score engine 210 that receives messages 200 sent and/or received by users.

The similarity score engine 210 may comprise a vector representation generator 220 that generates vector representations of messages 200. The vector representation generator 220 may accomplish this by generating a sparse vector representation of a message 200. A sparse vector representation may include a binary vector that indicates the presence or absence of certain words in the message 200, as discussed in further detail below with respect to FIG. 3. A condensed vector representation of the sparse vector may then be created. As discussed in further detail below with respect to FIG. 3, the condensed vector may be created by using a MinHash scheme. Other techniques for creating vector representations of messages 200 as known in the art may be used as well.

In some embodiments, the vector representation of the message 200 may include an embedding representation of the message 200. An embedding generally refers to a vector representation of an entity that represents the entity as a vector in n-dimensional space such that similar entities are represented by vectors that are close to one another in the n-dimensional space. Embeddings may be generated through the use of an embedding model, such as a neural network or other type of machine learning model that learns a representation (embedding) for an entity through a training process that trains the neural network based on a data set, such as a plurality of features of a plurality of entities.

The similarity score engine 210 may include a similarity score generator 240. The similarity score generator 240 may comprise, for example, a processor configured to use a set of rules to assign similarity scores to vector representations of messages 200 with respect to each respective message of historical messages 205, such as based on the number of components the condensed vector representations share. For example, the similarity score for two messages whose condensed vector representations share a majority of components in common may be very high. By contrast, the similarity score for two messages whose condensed vector representations share no components in common may be very low.

Multiple condensed vector representations may be created for each message, and the similarity score may be based on each of the condensed vector representations. Also, as discussed below with respect to FIG. 3, the vector representations may be of different sizes. For example, multiple condensed vector representations, each of different sizes, may be created for message 200. Multiple condensed vector representations, each of different sizes, may be created for a message of historical messages 205. Each vector representation of message 200 may be compared to a vector representation of the historical message that is the same size (e.g., a condensed vector with seven components is compared to a condensed vector with seven components). If the condensed vector representations of each size share a large percentage of components in common, the two messages may have a high similarity score with respect to each other. However, if only one set of condensed vectors share a large percentage of components in common, the similarity score may be low. Creating multiple condensed vector representations of different sizes prevents false positives and false negatives in classifying messages as discussed below with respect to FIG. 3, In some embodiments, similarity score generator 240 comprises one or more natural language processing algorithms and/or one or more machine learning models, such as a Bidirectional Encoder Representations from Transformer (BERT) model, a generative pre-trained (GPT) model, and/or the like. The similarity score generator 240 may, for example, use cosine similarity or a Jaccard index to determine similarity between two messages, (e.g., which may involve comparing embedding representations of the two messages). Other methods for determining similarity between two texts as known in the art are contemplated.

The similarity scores, along with data related to the messages, may then be provided to a spam identification engine 250. The spam identification engine 250 may comprise, for example, a processor configured to use a set of rules to determine whether to classify messages as spam. For example, it may be determined that message 200 is similar to other messages based on the similarity scores for message 200 with respect to the other messages exceeding a threshold. Data associated with the other messages may indicate that message 200 is similar to many messages that were sent recently (e.g., messages that were sent within a first time window, such as within the past three days). A message being similar to a large number of recently sent messages does not necessarily mean that the message is spam. For instance, many common types of messages, such as "I'll see you soon" and "OK sounds good," are not spam (e.g., these messages are frequently sent by legitimate users for legitimate purposes). However, if message 200 is similar to a large number of recently sent messages but only a small number of messages sent at earlier times (e.g., messages sent during a second time window, such as a time window several weeks in the past), this indicates that message 200 is part of a spam campaign that has recently been altered to evade spam detection measures. For example, a spam message that has been altered enough to evade a conventional spam detection mechanism may not be similar to messages sent during an earlier time period, as the conventional spam detection mechanism may be configured to detect the spam messages that were similar to spam messages sent during this time period. The first, more recent time period and the second, less recent time period may be of equal length, and/or the number of similar instances from these two time periods may be normalized in some manner to enable comparison, such as by dividing the numbers of similar instances by the lengths of the time periods (e.g., numbers of days, or the like) if the lengths are different.

In some embodiments, the spam identification engine 250 may detect spam messages by grouping messages together based on similarity, and then evaluating the messages based on the times at which the messages were sent. For example, a similarity score may be calculated between a first message and a second message, and the similarity score may exceed a threshold. Based on the score exceeding a threshold, a group comprising the first and second message may be formed. Other questions that have similarity scores exceeding a threshold relative to a message within the group may be added to the group. In some embodiments, the inclusion of a message within a group may be based on the percentage of questions within the group for which the message has a similarity score exceeding the threshold. Then, the group of messages may be classified as spam if many messages (e.g., more than a threshold number of messages) of the group were sent very recently, whereas a relatively small number were sent less recently.

In some embodiments, the determination as to whether a message (or a group of messages) is spam or not may be made by comparing the proportion of similar messages sent within a shorter time window to the proportion of similar messages sent within a longer time window. For example, the shorter time window may span three days preceding the sending of message 200, whereas the longer time window may span fourteen days preceding the sending of the message. If a larger number of similar messages were sent per day during the shorter time window than during the longer time window, then this may indicate that the message 200 is spam.

In some embodiments, spam identification engine 250 comprises a machine learning model that is trained to recognize spam messages. For example, the machine learning model may be trained to classify a message as spam based on the message being similar to a large amount of recently sent messages and a small amount of messages sent further in the past, or similar indications that a message is spam such as those discussed above. Also, this machine learning model may be re-trained based on user feedback such as discussed above with respect to FIG. 1. For example, if users identify messages as spam that the machine learning model did not identify, or if recipients of messages classified as spam indicate that the classified messages are not spam, then the parameters of the machine learning model may be adjusted accordingly. In one example, the threshold for the similarity score may be adjusted, and/or one or both of the time windows may be adjusted in response to the user feedback.

Example Spam Messages and Vector Representations of Spam Messages

Figure 3:
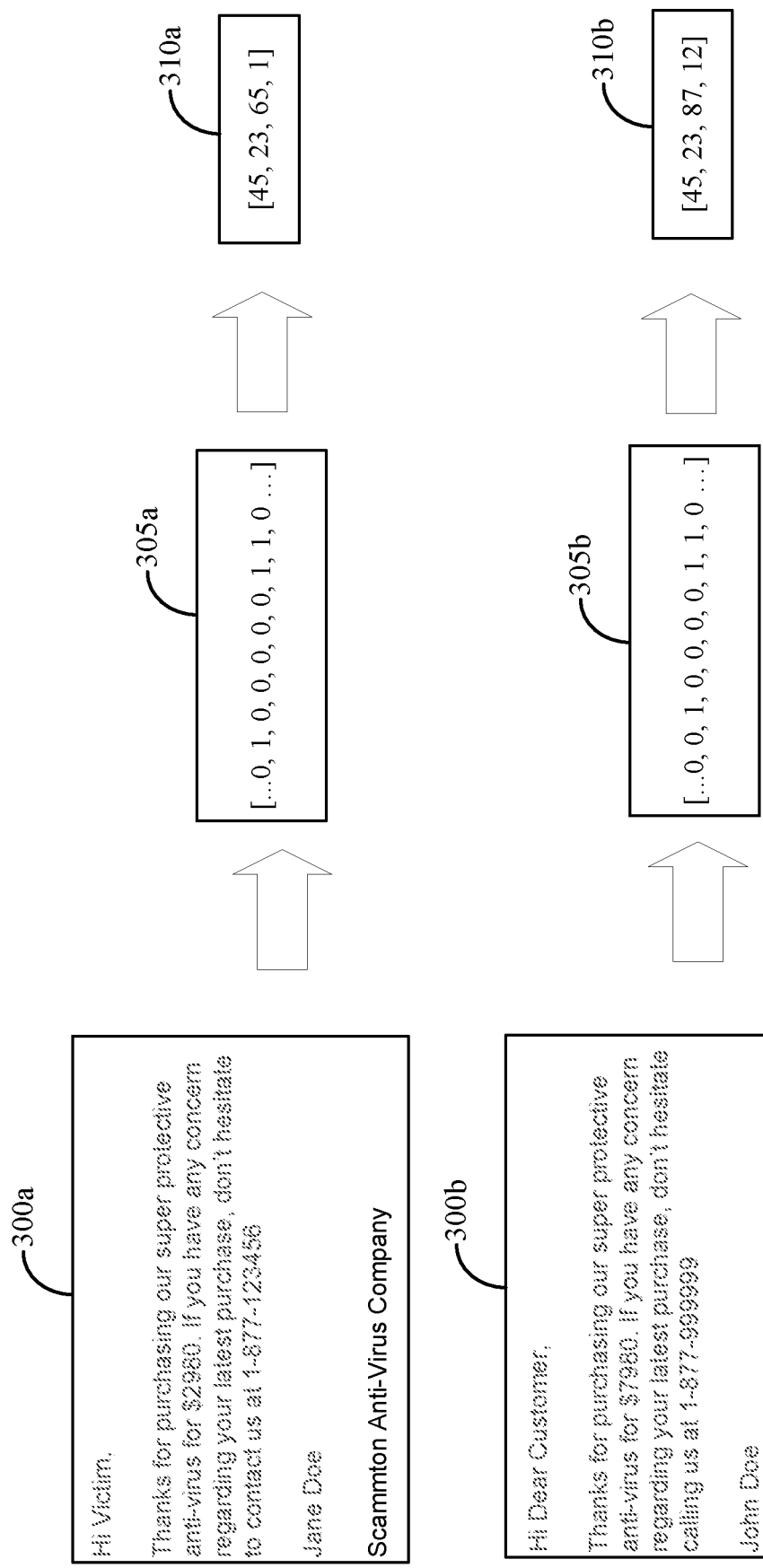
FIG. 3 depicts an example of spam messages and vector representations of spam messages.

FIG. 3 is an illustration of example spam messages and vector representations of spam messages.

In some embodiments, the messages 300*a* and 300*b* may be spam messages that were sent in an attempt to defraud recipients. The messages 300*a*, 300*b* shown in FIG. 3 are messages that are designed to trick users into calling a phone number to avoid being charged large amounts of money for a software that they did not purchase. Message 300*a* contains minor differences compared to message 300*b* (e.g., different phone numbers, names, and prices), but each has several characters, words, and phrases in common.

Certain embodiments provide that sparse vector representations 305*a*, 305*b* of the messages 300*a*, 300*b* may be created. These sparse vector representations 305*a*, 305*b* may comprise binary vectors that indicate the presence or absence of certain words. For example, some components of sparse vector 305*a* are the same as 305*b* because message 300*a* and message 300*b* each have some words in common. However, sparse vector 305*a* is not identical to sparse vector 305*b* because message 300*a* does not contain every word inside message 300*b*, and vice versa.

Sparse vector representations 305 of messages 300 may be very long in order to account for the possible words inside a message. As a result, condensed vector representations 310*a*, 310*b* of the sparse vectors 305*a*, 305*b* may be created to make comparison of the messages 300*a*, 300*b* simpler. Sparse vectors 310*a*, 310*b* may be created, for example, by using a MinHash scheme. MinHash, or min-wise independent permutations locality sensitive hashing, schemes involve creating condensed versions of vectors based on the desired number of components for the condensed vector. For example, if the desired number of components is seven, a condensed vector with seven components will be created. A comparison of the components of condensed vector 310*a* and condensed vector 310*b* may be performed to determine if the messages represented by the vectors are similar. For example, a similarity score may be generated based on the condensed vectors 310*a*, 310*b*. The similarity score may be high if the condensed vectors 310*a*, 310*b* share one or more components in common. Sparse vector 310*a* and sparse vector 310*b* each share their first two components in common, which indicates that the messages 300*a*, 300*b* corresponding to the sparse vectors 310*a*, 310*b* are similar. Thus, a similarity score generator may assign these two messages 300*a*, 300*b* a high similarity score.

In some embodiments, multiple MinHash representations of messages are created. Comparing multiple MinHash vector representations of the same messages reduces the risk of false positives and false negatives. For example, the MinHash scheme can generate two condensed vectors that share one or more components in common even though the sparse vectors and messages corresponding to the condensed vectors are not actually similar. This is due to the randomness inherent in MinHash schemes. However, if multiple MinHash representations of two messages are similar, this indicates that the similarity is not just an accident that results from MinHash estimation. Similarly, if there are few if any common components across multiple MinHash representations, this indicates that the determined lack of similarity is not just an accident. Also, MinHash representations of different sizes may be created, adding another guard against false positives and false negatives. For example, a representation of one message having a given size may be compared to a representation of another message having the same size. If multiple MinHash representations of different sizes each share multiple components in common, this indicates that the respective messages are similar.

Other methods for generating similarity scores are contemplated. For example, embedding representations of the messages 300*a*, 300*b* may be created. Though not shown here, these embedding representations may be used to generate a similarity score, such as by using a machine learning model that is trained to determine similarity based on embeddings as discussed above with respect to FIG. 2.

Figure 4:
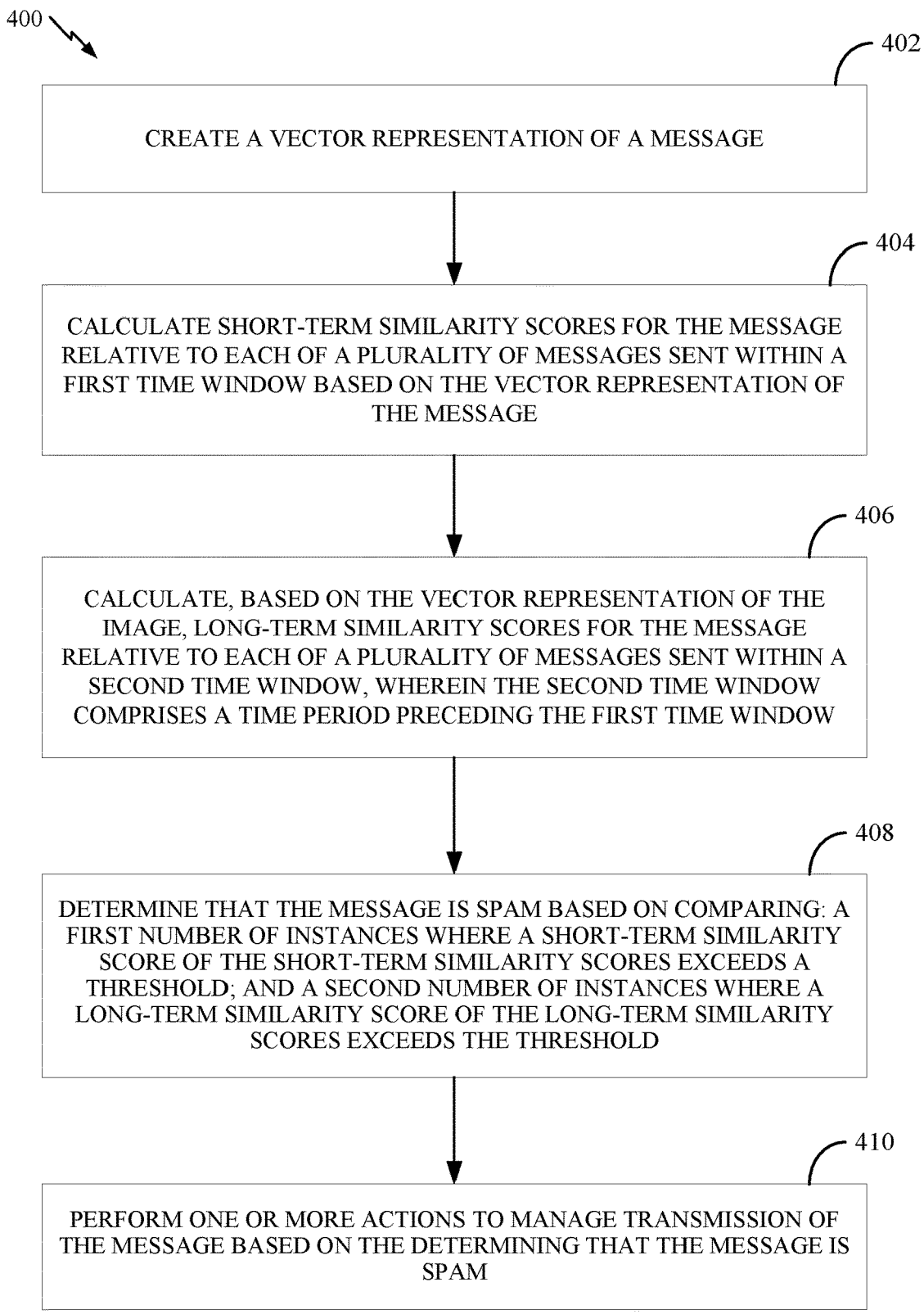
FIG. 4 depicts example operations related to automatically detecting spam messages and preventing the transmission of spam messages.

Example Operations Related to Detecting Spam Messages and Preventing the Transmission of Spam Messages FIG. 4 depicts example operations 400 related to automatically detecting spam messages and preventing the transmission of spam messages. For example, operations 400 may be performed by one or more of the components described in FIG. 1 and FIG. 2.

Operations 400 begin at step 402 with creating a vector representation of a message. In some embodiments, the vector representation of the message comprises a condensed vector representation that is created by applying a MinHash algorithm to a sparse vector representation of the message.

Operations 400 continue at step 404 with calculating short-term similarity scores for the message relative to each of a plurality of messages sent within a first time window based on the vector representation of the message. Certain embodiments provide that the first time window comprises a time period within a given number of days preceding a time at which the message was sent.

Operations 400 continue at step 406 with calculating, based on the vector representation of the message, long-term similarity scores for the message relative to each of a plurality of messages sent within a second time window, wherein the second time window comprises a time period preceding the first time window. In certain embodiments, the second time window comprises a respective time period within a respective number of days preceding a time at which the message was sent, wherein the respective number is larger than the given number. According to certain embodiments, the short-term similarity scores and the long-term similarity scores are based on multiple condensed representations of the message. Some embodiments provide that the multiple condensed representations include representations of different sizes.

Operations 400 continue at step 408 with determining that the message is spam based on comparing: a first number of instances where a short-term similarity score of the short-term similarity scores exceeds a threshold; and a second number of instances where a long-term similarity score of the long-term similarity scores exceeds the threshold.

Operations 400 continue at step 410 with performing one or more actions to manage transmission of the message based on the determining that the message is spam. Certain embodiments provide that the performing of the one or more actions comprises training a machine learning model, using a training data set that includes features of the message labeled with an indication that the message is spam, to output indications of whether messages are spam messages. According to some embodiments, the machine learning model is retrained based on user feedback with respect to an output generated by the machine learning model. In some embodiments, the performing of the one or more actions comprises automatically preventing transmission of the message.

Figure 5:
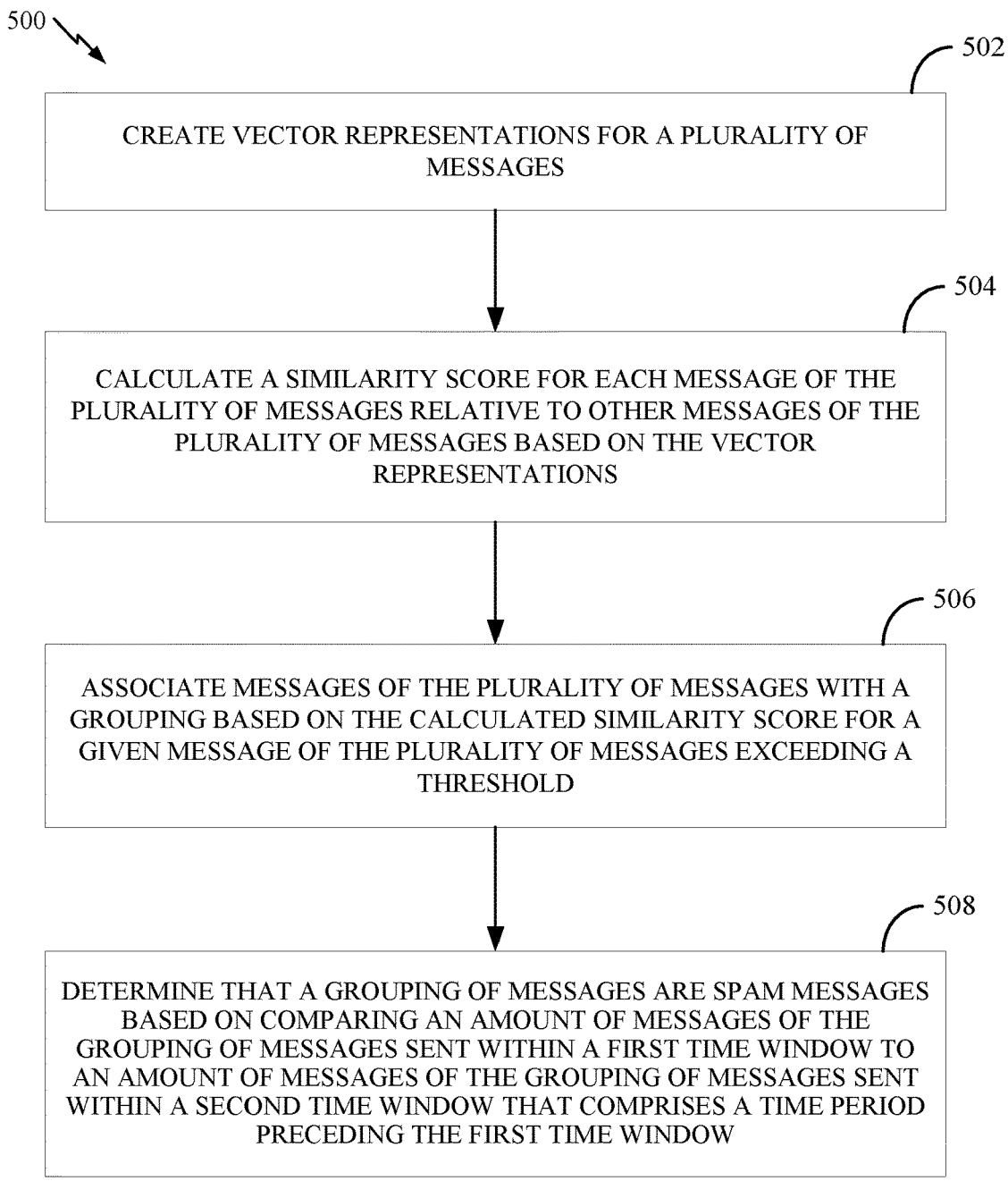
FIG. 5 depicts additional example operations related to automatically detecting spam messages and preventing the transmission of spam messages.

Additional Example Operations Related to Detecting Spam Messages and Preventing the Transmission of Spam Messages FIG. 5 depicts additional example operations 500 related to automatically detecting spam messages and preventing the transmission of spam messages. For example, operations 400 may be performed by one or more of the components described in FIG. 1 and FIG. 2.

Operations 500 begin at step 502 with creating vector representations for a plurality of messages. In some embodiments, the vector representation of the message comprises a condensed vector representation that is created by applying a MinHash algorithm to a sparse vector representation of the message.

Operations 500 continue at step 504 with calculating a similarity score for each message of the plurality of messages relative to other messages of the plurality of messages based on the vector representations.

Operations 500 continue at step 506 with associating messages of the plurality of messages with a grouping based on the calculated similarity score for a given message of the plurality of messages exceeding a threshold.

Operations 500 continue at step 508 with determining that a grouping of messages are spam messages based on comparing an amount of messages of the grouping of messages sent within a first time window to an amount of messages of the grouping of messages sent within a second time window that comprises a time period preceding the first time window. Certain embodiments provide that a data set comprising features of the grouping of spam messages with labels indicating that the messages are spam is used as training data to train a machine learning model to output indications of whether messages are spam messages. In some embodiments, the machine learning model is retrained based on user feedback with respect to an output generated by the machine learning model.

According to certain embodiments, the transmission of messages that are determined to be similar to messages within the grouping of spam messages is automatically blocked.

Figure 6:
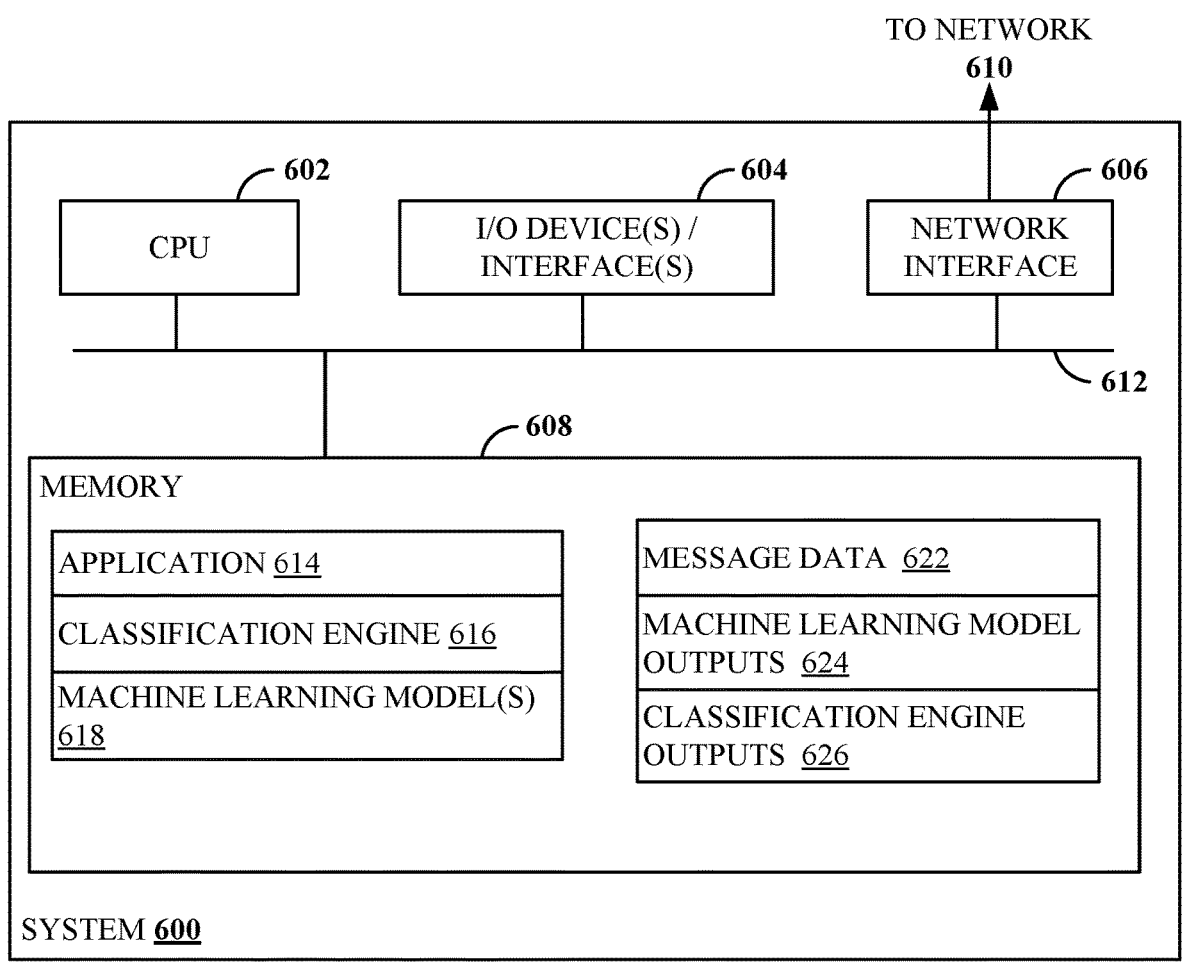
FIG. 6 depicts an example of a processing system for automatically detecting spam messages and preventing the transmission of spam messages.

Example of a Processing System for Detecting Spam Messages and Preventing the Transmission of Spam Messages FIG. 6 illustrates an example system 400 with which embodiments of the present disclosure may be implemented. For example, system 400 may be configured to perform operations 400 of FIG. 4, operations 500 of FIG. 5, and/or to implement one or more components as in FIG. 1 or FIG. 2.

System 600 includes a central processing unit (CPU) 602, one or more I/O device interfaces that may allow for the connection of various I/O devices 604 (e.g., keyboards, displays, mouse devices, pen input, etc.) to the system 600, network interface 606, a memory 608, and an interconnect 612. It is contemplated that one or more components of system 600 may be located remotely and accessed via a network 610. It is further contemplated that one or more components of system 600 may comprise physical components or virtualized components.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608. CPU 602 is included to be representative of a single CPU, multiple CPUs, a single CPU having multiple processing cores, and other arrangements.

Additionally, the memory 608 is included to be representative of a random access memory or the like. In some embodiments, memory 408 may comprise a disk drive, solid state drive, or a collection of storage devices distributed across multiple storage systems. Although shown as a single unit, the memory 608 may be a combination of fixed and/or removable storage devices, such as fixed disc drives, removable memory cards or optical storage, network attached storage (NAS), or a storage area-network (SAN).

As shown, memory 608 includes application 614, classification engine 616, and machine learning models 618. Application 614 may be representative of messaging environment 120 of FIG. 1. Classification engine 616 may be representative of classification engine 100 of FIG. 1 and FIG. 2. In some embodiments, machine learning models 618 may be representative of machine learning model 140 of FIG. 1, and/or of one or more machine learning models used in vector representation generator 220, similarity score generator 240, and/or spam identification engine 250 of FIG. 2.

Memory 608 further comprises message data 622, which may correspond to message data 112 of FIG. 1; message 200 and/or historical messages 205 of FIG. 2; and/or message 300, sparse vector representation 305, and/or condensed vector representation 310 of FIG. 3. Memory 608 further comprises machine learning model output 624 which may correspond to outputs of vector representation generator 220, outputs of similarity score generator 240, and/or outputs of spam identification engine 250 of FIG. 2. Memory 608 further comprises classification engine outputs 424, which may include outputs of vector representation generator 220, outputs of similarity score generator 240, and/or outputs of spam identification engine 250 of FIG. 2.

It is noted that in some embodiments, system 600 may interact with one or more external components, such as via network 610, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of identifying spam messages, comprising:
   creating a vector representation of a message;
   calculating short-term similarity scores for the message relative to each of a plurality of messages sent within a first time window based on the vector representation of the message;
   calculating, based on the vector representation of the message, long-term similarity scores for the message relative to each of a plurality of messages sent within a second time window, wherein the second time window comprises a time period preceding the first time window;
   determining that the message is spam based on comparing:
     a first number of instances where a short-term similarity score of the short-term similarity scores exceeds a threshold; and
     a second number of instances where a long-term similarity score of the long-term similarity scores exceeds the threshold; and
   performing one or more actions to manage transmission of the message based on the determining that the message is spam.

2. The method of claim 1, wherein the vector representation of the message comprises a condensed vector representation that is created by applying a MinHash algorithm to a sparse vector representation of the message.

3. The method of claim 2, wherein the short-term similarity scores and the long-term similarity scores are based on multiple condensed representations of the message.

4. The method of claim 3, wherein the multiple condensed representations include representations of different sizes.

5. The method of claim 1, wherein the performing of the one or more actions comprises training a machine learning model, using a training data set that includes features of the message labeled with an indication that the message is spam, to output indications of whether messages are spam messages.

6. The method of claim 5, wherein the machine learning model is retrained based on user feedback with respect to an output generated by the machine learning model.

7. The method of claim 1, wherein the first time window comprises a time period within a given number of days preceding a time at which the message was sent.

8. The method of claim 7, wherein the second time window comprises a respective time period within a respective number of days preceding a time at which the message was sent, wherein the respective number is larger than the given number.

9. The method of claim 1, wherein the performing of the one or more actions comprises automatically preventing transmission of the message.

10. A system for identifying spam messages, comprising:
    one or more processors; and
    a memory comprising instructions that, when executed by the one or more processors, cause the system to:
      create a vector representation of a message;
      calculate short-term similarity scores for the message relative to each of a plurality of messages sent within a first time window based on the vector representation of the message;
      calculate, based on the vector representation of the message, long-term similarity scores for the message relative to each of a plurality of messages sent within a second time window, wherein the second time window comprises a time period preceding the first time window;

determine that the message is spam based on comparing:
- a first number of instances where a short-term similarity score of the short-term similarity scores exceeds a threshold; and
- a second number of instances where a long-term similarity score of the long-term similarity scores exceeds the threshold; and perform one or more actions to manage transmission of the message based on the determining that the message is spam.

11. The system of claim 10, wherein the vector representation of the message comprises a condensed vector representation that is created by applying a MinHash algorithm to a sparse vector representation of the message.

12. The system of claim 11, wherein the short-term similarity scores and the long-term similarity scores are based on multiple condensed representations of the message.

13. The system of claim 10, wherein the performing of the one or more actions comprises training a machine learning model, using a training data set that includes features of the message labeled with an indication that the message is spam, to output indications of whether messages are spam messages.

14. The system of claim 10, wherein the machine learning model is retrained based on user feedback with respect to an output generated by the machine learning model.

15. The system of claim 10, wherein the performing of the one or more actions comprises automatically preventing transmission of the message.

16. A method of identifying spam messages, comprising:
creating vector representations for a plurality of messages;
calculating a similarity score for each message of the plurality of messages relative to other messages of the plurality of messages based on the vector representations;
associating messages of the plurality of messages with a grouping based on the calculated similarity score for a given message of the plurality of messages exceeding a threshold; and
determining that a grouping of messages are spam messages based on comparing an amount of messages of the grouping of messages sent within a first time window to an amount of messages of the grouping of messages sent within a second time window that comprises a time period preceding the first time window.

17. The method of claim 16, wherein a data set comprising features of the grouping of spam messages with labels indicating that the messages are spam is used as training data to train a machine learning model to output indications of whether messages are spam messages.

18. The method of claim 16, wherein the machine learning model is retrained based on user feedback with respect to an output generated by the machine learning model.

19. The method of claim 16, wherein the vector representation of the message comprises a condensed vector representation that is created by applying a MinHash algorithm to a sparse vector representation of the message.

20. The method of claim 16, wherein the transmission of messages that are determined to be similar to messages within the grouping of spam messages is automatically blocked.

* * * * *